United States Patent [19]

Blasiole

[11] Patent Number: 5,704,301
[45] Date of Patent: Jan. 6, 1998

[54] ROTARY COMBUSTOR AND SPRING ASSEMBLY THEREFOR

[75] Inventor: George A. Blasiole, Greensburg, Pa.

[73] Assignee: Westinghouse Electric Corporation, Pittsburgh, Pa.

[21] Appl. No.: 554,683

[22] Filed: Nov. 7, 1995

[51] Int. Cl.⁶ ............................................. A47J 36/00
[52] U.S. Cl. ........................ 110/246; 432/115; 432/251; 110/226
[58] Field of Search ............................ 110/226, 246; 432/103, 108, 110, 115, 251

[56] References Cited

U.S. PATENT DOCUMENTS

| | | | |
|---|---|---|---|
| 2,877,007 | 3/1959 | Risse | 432/103 X |
| 4,765,255 | 8/1988 | Chiarva | 110/246 X |
| 4,953,480 | 9/1990 | Collins, Jr. | 110/246 |

FOREIGN PATENT DOCUMENTS 1643-907-A   4/1991   U.S.S.R. ................... 432/115

*Primary Examiner*—Henry A. Bennett
*Assistant Examiner*—Susanne C. Tinker

[57] ABSTRACT

Rotary combustor and spring assembly therefor. The combustor includes a tire surrounding a kiln and a spring assembly interposed between the tire and kiln for interconnecting the tire and kiln. The spring assembly includes a clevis member attached to the tire and a spring member having an end portion thereof pivotally connected to the clevis member and an intermediate portion thereof attached to the kiln. The other end portion of the spring member is pivotally connected to an adjacent clevis member. The spring member allows for relative motion of the tire and the kiln as the first and second end portions of the spring member pivot about their respective clevis members.

12 Claims, 6 Drawing Sheets

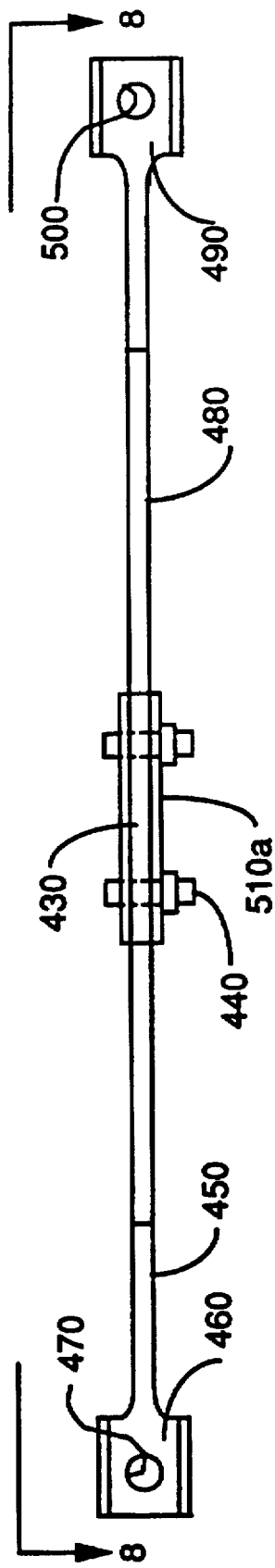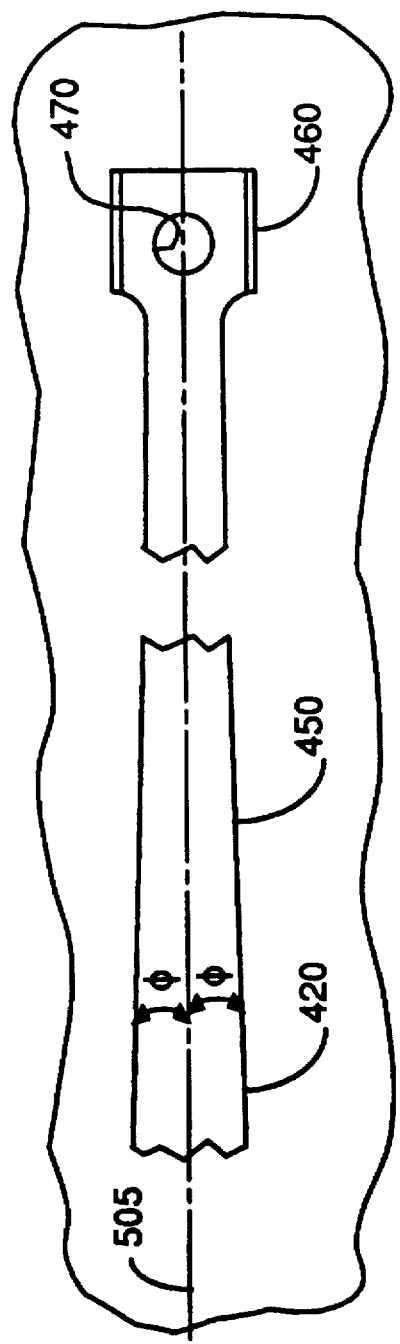
FIG. 7
FIG. 7A

ROTARY COMBUSTOR AND SPRING ASSEMBLY THEREFOR

BACKGROUND OF THE INVENTION

This invention generally relates to rotary combustors and more particularly relates to a rotary combustor and spring assembly therefor.

A rotary combustor is a device for burning municipal waste and for generating electricity using the waste heat produced as a by-product of the combustion. The municipal waste is deposited into a feed hopper and from there into a rotating cylindrical kiln formed by a plurality of parallel heat transfer tubes arranged in a circular array. The tubes allow water to flow therethrough, with a steam-water mixture being produced within the tubes due to the heat transfer from the burning waste to the water flowing through the heat transfer tubes. The steam-water mixture in the tubes is transported to heat exchanger pipes disposed in a boiler that is in communication with the kiln for reasons disclosed hereinbelow. Moreover, a tire typically encircles each end of the kiln and is connected to the kiln, such as by metal plates, for rotating the kiln. The tire itself is engaged by at least one motor for rotating the tire which in turn rotates the kiln.

Air is charged into the kiln through a porous web-like structure interconnecting the heat transfer tubes. The air entering through the pores of the web-like structure assist in sustaining the combustion process occurring within the kiln. Combustion gases from the kiln pass out an open end thereof and into the boiler. The gases rise in the boiler and flow over the previously mentioned heat exchanger pipes disposed in the boiler in order to produce superheated steam in the heat exchanger. The superheated steam is fed to a turbine-generator for producing electricity which is provided to a transmission grid of an electric utility for producing revenue. The combustion process occurring in the kiln reduces the volume of the municipal waste by more than ninety percent, with the resultant ash being hauled to a landfill.

The tubes and web structure forming the cylindrical geometry of the kiln typically reach an operating temperature of about 500° Fahrenheit. However, when idle, the temperature will drop to the surrounding ambient temperature (e.g., about 0° to 100° Fahrenheit). Thus, the kiln will experience significant thermal expansion and contraction as the temperature fluctuates between the idle and operating temperatures (i.e., about 0° to 500° Fahrenheit). The previously mentioned plates, kiln and tire are therefore required to accommodate the thermal expansion and contraction. In order to accommodate the thermal expansion and contraction, the relatively thin plates will bend in the direction of the radius of the kiln, which is perpendicular to the plane of the plates; thus, the plates will act like flat springs. However, the differential thermal expansion/contraction of the kiln and the tire in addition to the thermal expansion/contraction of the flat springs may subject the springs to fatigue failure shortening the useful life of the springs. More specifically, failure of the springs is caused by relatively high stresses induced therein due to a combination of thermally induced cyclic stresses in the springs together with the weight of the kiln and waste acting on the springs. Such "premature" failure of the springs necessarily requires periodic replacement thereof, thereby increasing costs associated with operating the combustor. Therefore, a problem in the art is to provide a rotary combustor spring member having reduced susceptibility to stress failure.

Moreover, it is desirable that the axis of rotation of the kiln remain substantially in the same position during operation and also when idle in order to avoid build-up of excessive stresses in piping and fittings connecting the kiln to pumps, boilers and other equipment. Such excessive stresses may lead to premature failure in the piping and fittings. That is, the thermal expansion and contraction of the kiln may tend to move the kiln from its preferred position thereby generating excessive stresses in the piping and fittings. Therefore, another problem in the art is to provide a rotary combustor having means for maintaining the kiln substantially in the same position when operating and also when idle.

Devices accommodating thermal expansion of rotary combustor components are known. Such a device is disclosed in U.S. Pat. No. 4,953,480 titled "Rotary Waterwall Combustor With Improved Tire Attachment" issued Sep. 4, 1990 in the name of William G. Collins, Jr. and assigned to the assignee of the present invention. This patent discloses a plurality of attachments for connecting a waterwall combustor to a tire. Each attachment comprises a support block attached to the combustor and a linkage pivotally connecting the support block to the tire so as to support the combustor within the tire, maintain the position of the central axis of the combustor and provide for differential thermal expansion of the combustor, the pinned linkage and the tire. According to the Collins, Jr. patent, the links can be relatively thick, rather than thin, to be strong enough to carry the weight of the combustor. Moreover, this patent discloses that such relatively thick links obviate the need to accommodate bending in the links. Bending of the links is not a consideration, according to this patent, because the links pivotally connect each support block to the tire. Although such a device can satisfactorily perform its intended function, stresses wear and elongation of the links may develop to an unacceptable level, thereby shortening the useful life of the device.

This invention provides for a useful life of 20 years. It is designed to maintain stresses and deformation significantly low and keeps deformation well into the elastic range, thereby avoiding permanent deformation.

Therefore, what is needed is a rotary combustor having a suitable spring assembly therefor.

SUMMARY OF THE INVENTION

Disclosed herein are a rotary combustor and spring assembly therefor. The combustor includes a tire surrounding a kiln and a spring assembly interposed between the tire and kiln for interconnecting the tire and kiln. The spring assembly includes a clevis member attached to the tire and a spring member having an end portion thereof pivotally connected to the clevis member and an intermediate portion thereof attached to the kiln, the other end portion of the spring member is pivotally connected to an adjacent clevis member. The spring member allows for relative motion of the tire and the kiln as the first and second end portions of the spring member pivot about their respective clevis members.

In its broad form the invention is, in a rotary combustor having a tire surrounding a kiln, a spring assembly, comprising a clevis member attached to the tire; and a spring member having a first portion thereof pivotally connected to said clevis member and a second portion thereof attached to the kiln, whereby said spring member allows for relative motion of the tire and the kiln as the first portion of said spring member pivots about said clevis member.

In its broad form the invention is also a rotary combustor for burning waste material, comprising a rotatable kiln for burning the waste material therein, said kiln having a circular perimeter; a tire surrounding said kiln for rotating said kiln, said tire having an inner circumference; a first clevis member attached to the inner circumference of said tire; a second clevis member spaced-apart form said first clevis member and attached to the inner circumference of said tire; a first pivot pin extending through said first clevis member; a second pivot pin extending through said second clevis member; and an elongate spring member interposed between said tire and said kiln, said spring member having an intermediate portion thereof attached to the perimeter of said kiln and having a first arm portion having a first bore therethrough for pivotally receiving said first pin and having a second arm portion having a second bore therethrough for pivotally receiving said second pin, whereby said spring member flexes for mitigating stress in said tire and said kiln as the first arm portion pivots about said first pin and as the second arm portion pivots about the second pin and as the intermediate portion is attached to the perimeter of said kiln.

An object of the present invention is to provide a rotary combustor and spring member therefor having reduced susceptibility to stress failure.

Another object of the present invention is to provide a rotary combustor having means for maintaining the kiln substantially in the same position when operating and also when idle.

A feature of the present invention is the provision of a plurality of spring members interposed between the kiln and a tire surrounding the kiln for accommodating differential thermal expansion between the kiln and tire.

An advantage of the present invention is that the longitudinal axis of the kiln remains fixed because any relative motion of the kiln and the tire will be accommodated by the flexing of the spring members.

Another advantage of the present invention is that the welded attachment of the spring members to the kiln is less susceptible to stress cracking.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following description taken in conjunction with the accompanying drawings wherein:

FIG. 7 is a view in elevation of the spring member;

FIG. 7A is an enlarged fragmentation view of the spring member showing tapered arm portions thereof;

DESCRIPTION OF THE PREFERRED EMBODIMENTS

Figure 1:
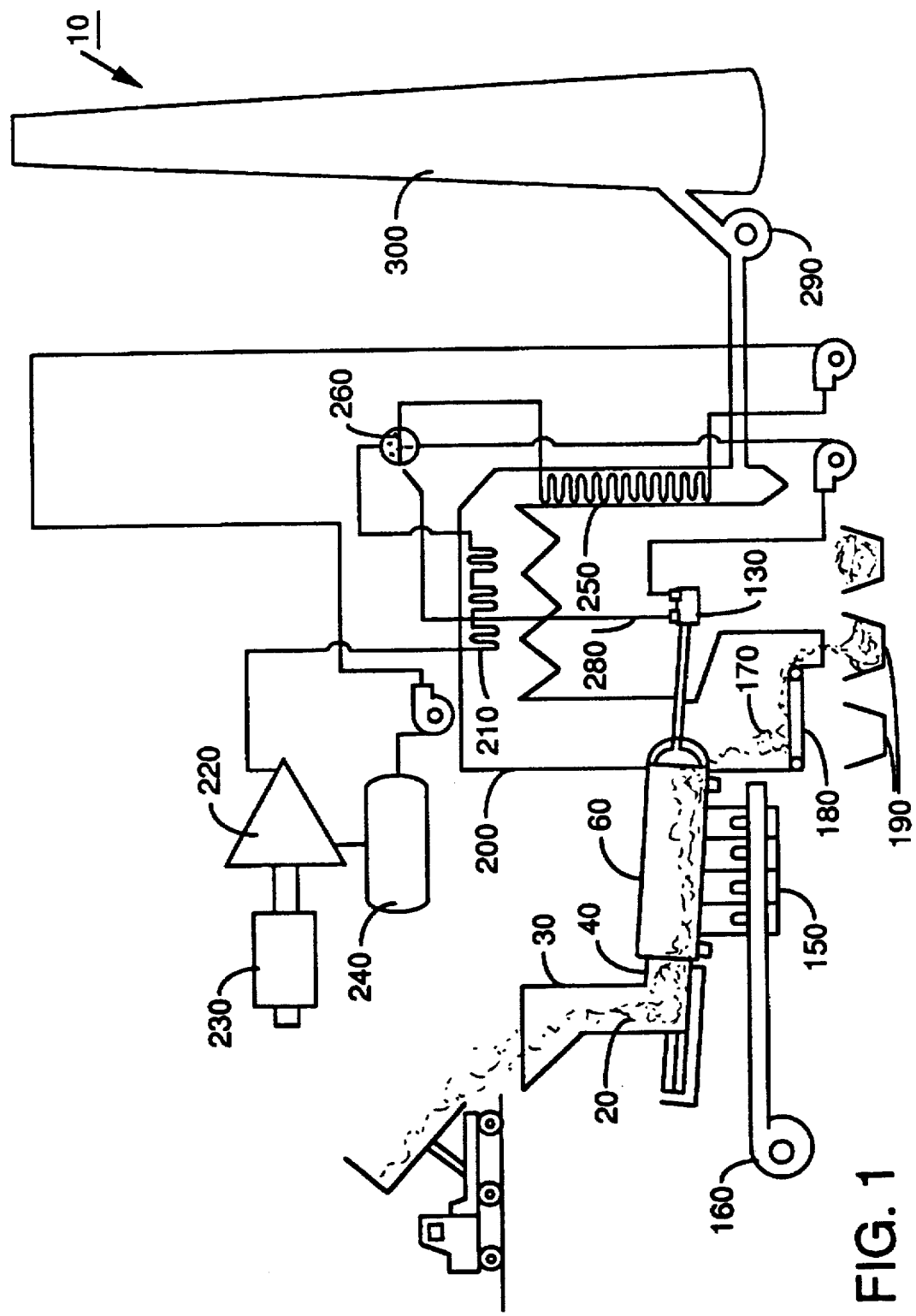
FIG. 1 illustrates a typical rotary combustor with parts removed for clarity, the combustor including a feed chute having an outlet end disposed adjacent an inlet end of a rotatable kiln.
Figure 2:
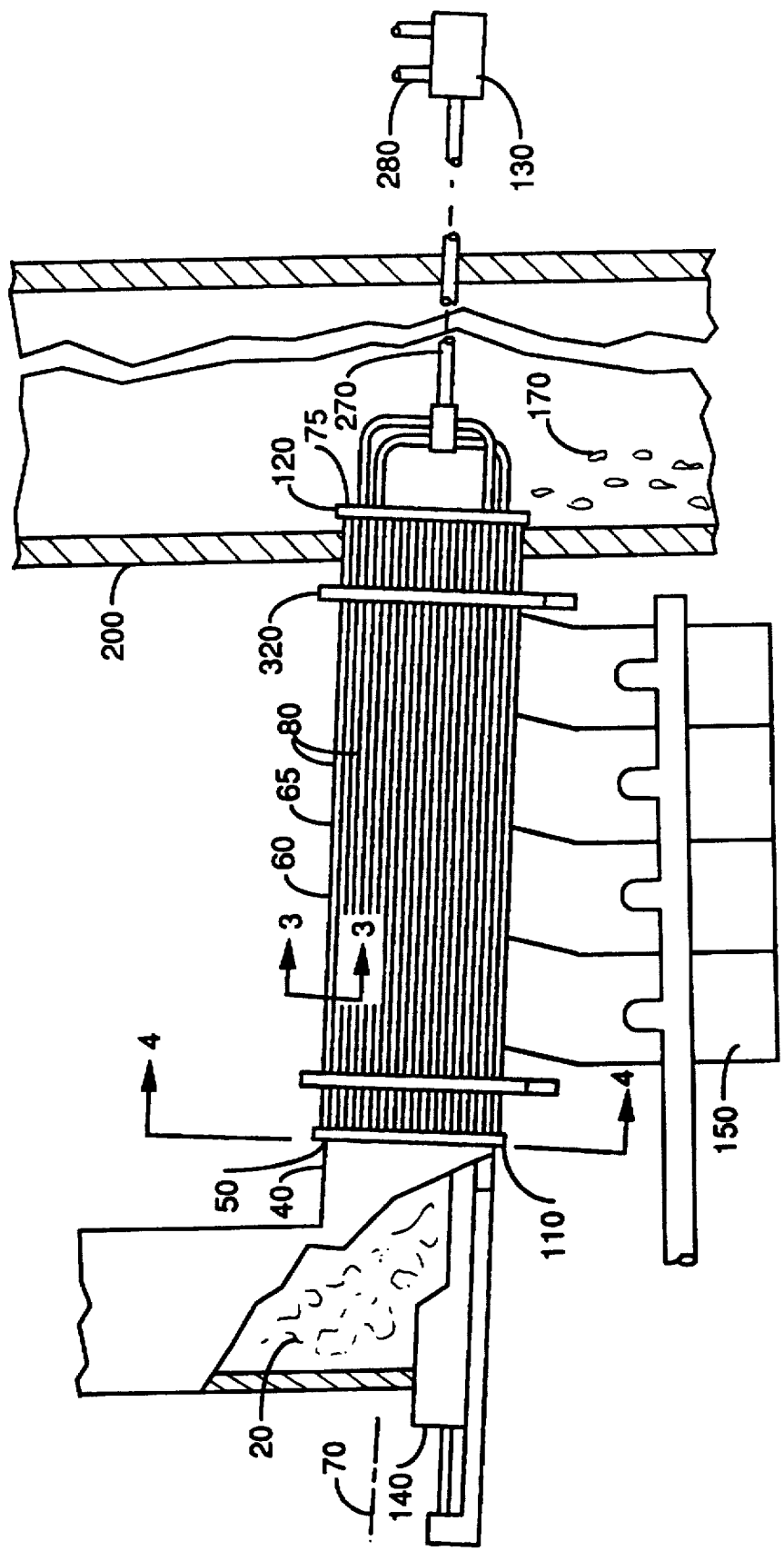
FIG. 2 is a view in elevation of the outlet end of the feed chute disposed adjacent to the inlet end of the kiln, this view also showing a pair of tires surrounding respective ends of the kiln.
Figure 3:
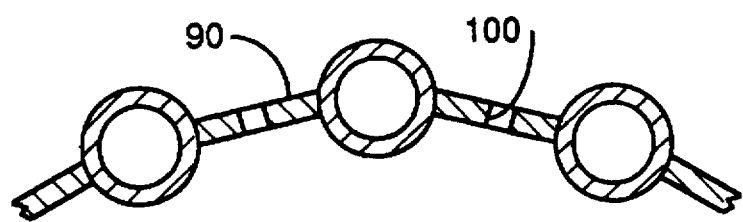
FIG. 3 is a view taken along section line 3—3 of FIG. 2.

Referring to FIGS. 1 and 2, there is shown a rotary combustor, generally referred to as 10, for burning municipal waste 20 and for converting the waste heat into electricity. Combustor 10 comprises a feed chute 30 adapted to receive waste 20 therein. Feed chute 30 has an outlet end 40 aligned with an inlet end 50 of a generally cylindrical and rotatable kiln 60, the kiln 60 being rotatable about an inclined longitudinal axis 70. Kiln 60 has an outer circumference 65 and also includes a discharge end 75 for reasons disclosed hereinbelow. Kiln 60 comprises a plurality of heat transfer tubes 80 arranged in spaced parallel circular array centered about axis 70. The purpose of tubes 80 is to conduct a heat transfer medium (i.e., water) therethrough for removing the heat generated within kiln 60. Moreover, interconnecting tubes 90 is a web-shaped support structure 90 (see FIG. 3) for supporting tubes 90, web structure 90 having a multiplicity of holes 100 therethrough for allowing air to enter kiln 60 to aid combustion therein. As shown in FIGS. 1 and 2, each of the tubes 80 has a first end portion terminating at an inlet ring-shaped manifold, plenum or header 110. Each of the tubes 80 also has a second end portion terminating at an outlet ring-shaped manifold, plenum or header 120 that is connected to a rotary joint 130 for reasons disclosed hereinbelow.

Still referring to FIGS. 1 and 2, waste 20 is urged by a ram feeder 140 from feed chute 30 and into kiln 60 where waste 20 is burned. In this regard, combustion is aided by air forced through a windbox 150, which forced air may be by means of a fan 160 that forces air through holes 100 and into kiln 60. Ash 170 from the combustion will fall out discharge end 75 of inclined kiln 60 and from there onto a moving grate 180 which conveys ash 170 to a conveyance system 190 for removal to a disposal site.

Referring again to FIGS. 1 and 2, the discharge end 75 of kiln 60 communicates with a boiler 200 having a bank of superheaters 210 therein to produce superheated steam, as disclosed in more detail presently. In this regard, hot gases from the combustion rise upwardly from discharge end 75 of kiln 60 and travel across the bank of superheaters 210, so that the steam-water mixture flowing into superheaters 210 from tubes 80 is further vaporized into superheated steam. Superheaters 210 supply the superheated steam to a turbine 220 which rotates an electrical generator 230 for producing electricity. After the steam is used by turbine 220, it flows to a condenser 240 where it is condensed into liquid water. Also disposed in boiler 230 downstream from superheaters 210 is an "economizer" heat exchange device 250, for reasons disclosed presently. The water from condenser 240 is pumped to economizer 250 for removing additional heat from the hot gases as the gases pass over economizer 250, which occurs after the hot gases have passed superheaters 210. The water exiting economizer 250 flows to a steam drum 260 where the fluid exists in both liquid and vapor state. The liquid portion of the fluid in steam drum 260 is pumped to rotary joint 130. Rotary joint 130 is in fluid communication with a coaxial pipe 270 that feeds the liquid water into tubes 80 and that returns a hot water and steam mixture to rotary joint 130. The steam-water mixture flows (such as via a pipe 280) from rotary joint 130 to steam drum 260 where the steam is separated and from there flows into the bank of superheaters 210 to be superheated prior to being supplied to turbine 220.

Figure 4:
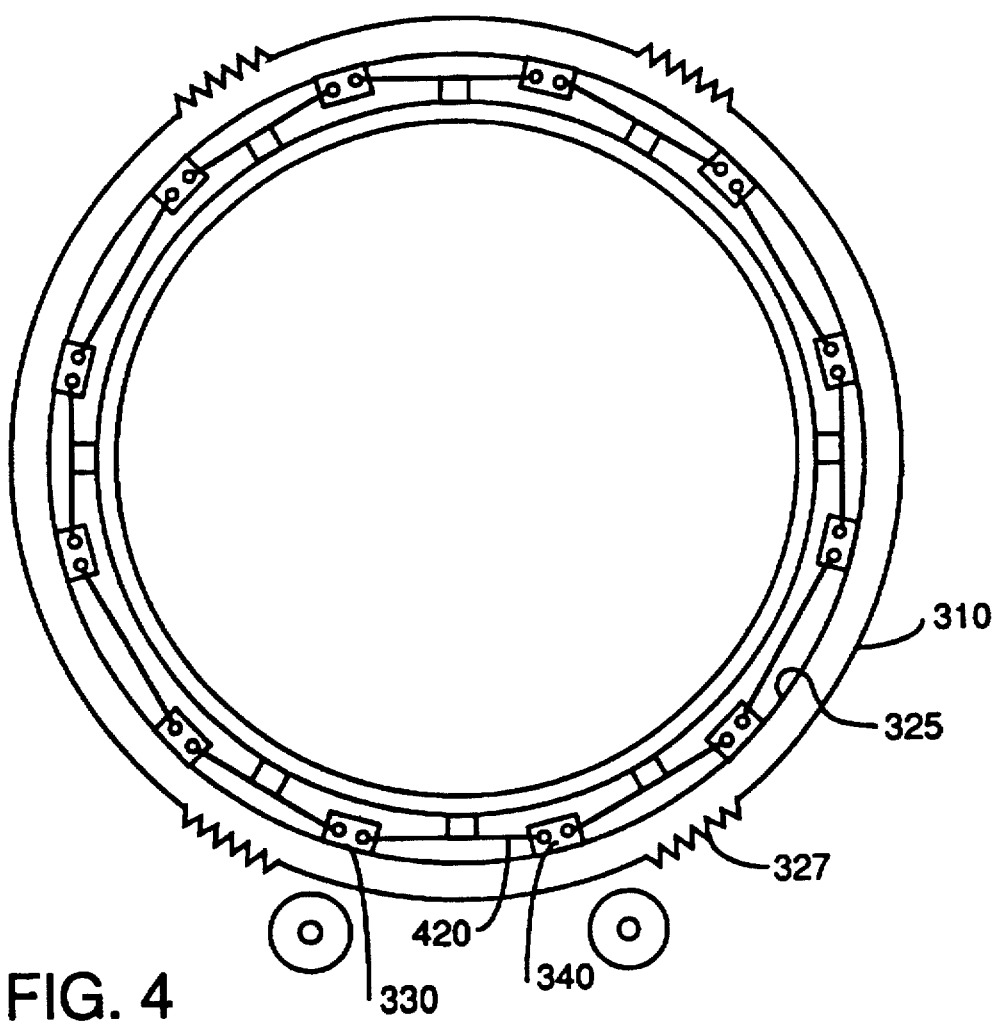
FIG. 4 is a view taken along section line 4—4 of FIG. 2.

Referring to FIGS. 1, 2 and 4, after the hot combustion gases flowing through boiler 200 pass economizer 250, the gases are then drawn, such as by fan 290, into a flue stack 300 for release into the atmosphere. Rotary combustor 10 may further include a dry scrubber (not shown) and a baghouse (not shown) in communication with both boiler 200 and flue stack 300 for removing undesirable constituents from the gases before the gases flow into flue stack 300. Moreover, rotary combustor 10 further includes two annular tires 310 and 320 respectively surrounding the inlet end 50 and the discharge end 75 of kiln 60 for rotating kiln 60 about the axis 70. Tire 310 has an inner circumference 325 and includes sprocket teeth 327 about the outer circumference thereof for engaging a chain belt (not shown) that is pulled by a motor (not shown), the chain belt rotating the sprocket teeth 327 of tire 310 which in turn rotate kiln 60 about inclined axis 70.

Figure 5:
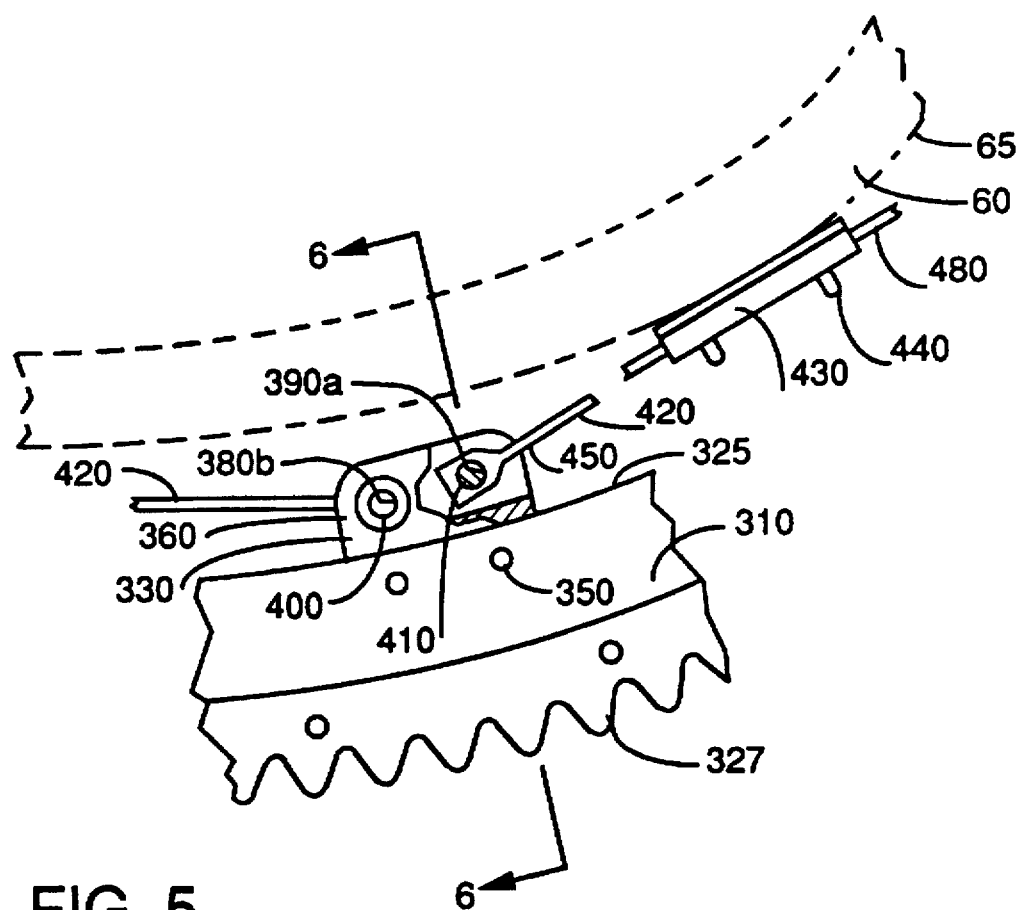
FIG. 5 is a view in partial elevation of a clevis member attached to the inside circumference of one of the tires, this view also showing a spring member connecting the clevis member to the kiln.
Figure 6:
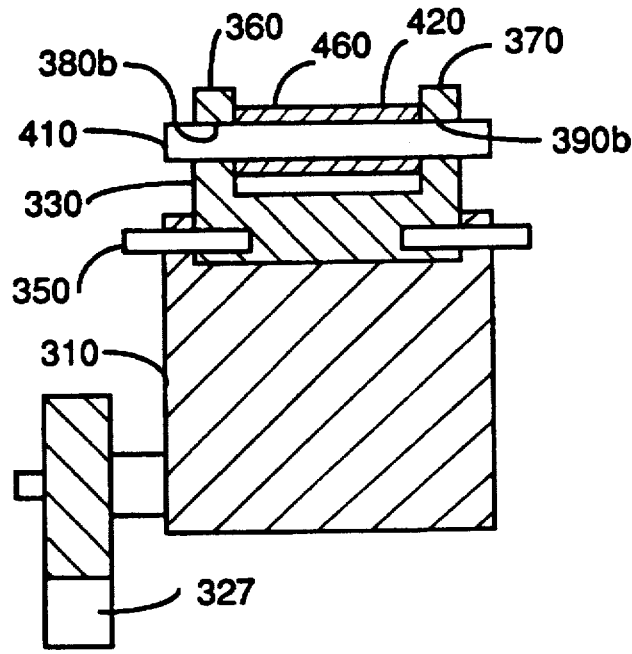
FIG. 6 is a view taken along section line 6—6 of FIG. 5.

Referring now to FIGS. 4, 5 and 6, there is shown a first clevis member 330 and a second clevis member 340 attached to the inner circumference 325 of tires 310 and 320 by any convenient means, such as by pins 350. Each of the clevis members 330/340 has a generally U-shaped transverse cross section including a pair of tines 360 and 370. Each tine 360 and 370 has a pair of parallel bores 380a/380b and 390a/390b, respectively therethrough. That is, tine 360 has parallel aligned bores 380a and 380b (only bore 38b being shown) formed transversely therethrough and tine 370 has parallel aligned bores 390a and 390b formed transversely therethrough. A first pivot pin 400 extends through bores 380a and 380b and a second pivot pin 410 extends through bores 390a and 390b for reasons disclosed hereinbelow. There are a plurality of adjacent clevis members spaced-apart around inner circumference 325 of each tire 310 and 320.

Turning now to FIGS. 4, 5, 6, 7, 7A and 8, a plurality of elongate spring members 420 are interposed between tire 310 and kiln 60 for interconnecting tire 310 and kiln 60 and for mitigating stress in tire 310 and kiln 60 due, for example, to differential thermal expansion between tire 310 and kiln 60. Each spring member includes a thickened intermediate portion 430 attached to kiln 60 preferably by welding. Alternatively, intermediate portion 430 may be attached to kiln 60 by means of bolts 440. However, welding is preferred because high stresses may occur in bolts 440 during operation of kiln 60. Welding provides a stronger point of attachment when compared to bolting and when welded in accordance with the invention, reduces the susceptibility to stress failure. Each spring member 420 includes a relatively thin first arm portion 450 integrally attached to thickened intermediate portion 430. First arm portion 450 terminates in a first end portion 460 having a hole 470 transversely therethrough for reasons disclosed presently. Moreover, each spring member 420 includes a relatively thin second arm portion 480 integrally attached to thickened intermediate portion 430. Second arm portion 480 terminates in a second end portion 490 having a hole 500 transversely therethrough for reasons disclosed presently. In this regard, first end portion 460 is received between tines 360 and 370. As first end portion 460 is received between tines 360 and 370, first pivot pin 400 extends through bore 380b, through hole 470 and through bore 390b. In this manner, first end portion 460 is pivotally connected to first clevis member 330, so that spring member 420 is pivotally connected to tire 310. In a similar manner, second end portion 490 is received between the tines of adjacent clevis member 340. As second end portion 490 is received between the tines of clevis member 340, another first pivot pin will extend through bore 380b, hole 470 and bore 390b that are formed through second clevis member 340. In this manner, second end portion 490 is pivotally connected to second clevis 340, so that spring member 420 is pivotally connected to tire 310. In addition, first arm portion 450 tapers in transverse cross section as it outwardly extends from the larger cross section of thickened intermediate portion 430. Similarly, second arm portion 480 tapers in transverse cross section as it outwardly extends from the larger cross section of thickened intermediate portion 430. The tapering of arm portions 450/480 allow spring member 420 to be resilient and bendable without inducing excessive stresses therein. As shown in FIG. 7A, the tapering of arm portions 450/480 are such that a predetermined angle "φ" is defined between the exterior surfaces of arm portions 450/480 and a centerline 505 extending through arm portions 450/480.

Figure 8:
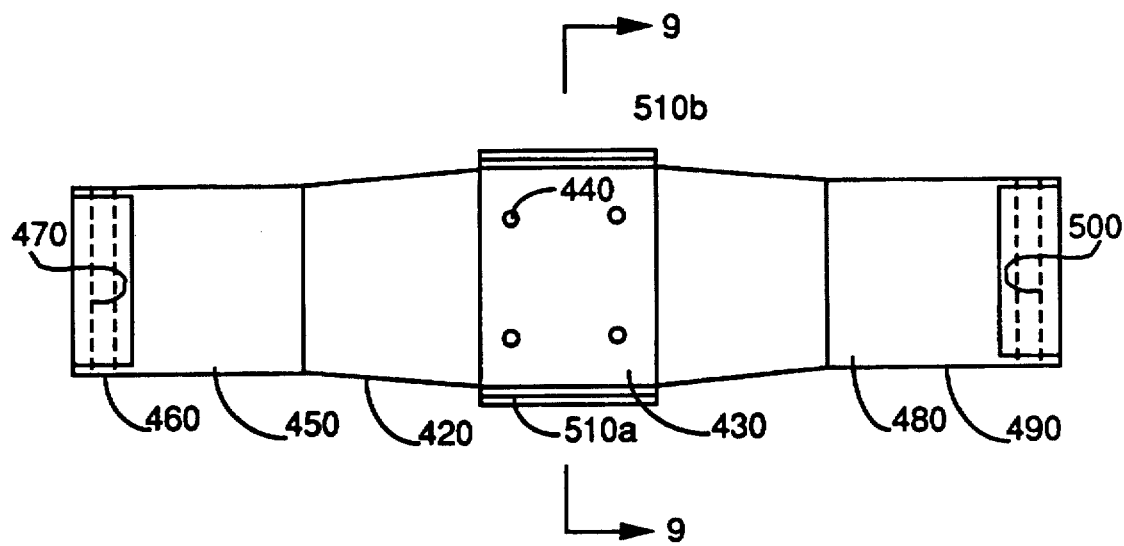
FIG. 8 is a plan view of the spring member taken along section line 8—8 of FIG. 7.
Figure 9:
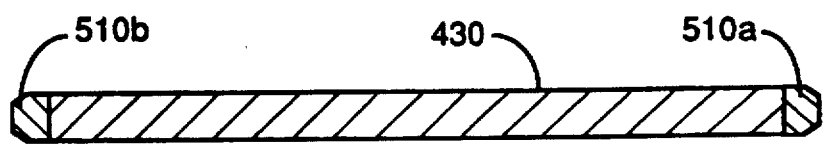
FIG. 9 is a view taken along section line 9—9 of FIG. 8.

As best seen in FIGS. 7, 8 and 9, thickened intermediate portion 430 of each spring member 420 includes a pair of flanges 510a and 510b integrally attached thereto and disposed on either side of thickened intermediate portion 430. Flanges 510a and 510b are adapted to be suitably welded to outer circumference 65. In this regard, flanges 510a/510b are preferably welded to a support pad (not shown) which in turn is welded to kiln 60. Alternatively, flanges 510a/510b may be connected to a support pad (not shown), such as by bolts 440. Moreover, it is important that flanges 510a/510b be formed of a metal having predetermined properties obviating the need to perform pre-heating or post-heating of the flanges 510a/510b in order to prevent stress corrosion cracking in flanges 510a/510b. In this regard, flanges 510a/510b are preferably formed from carbon steel which is readily weldable without the need for heat treating processes.

An advantage of the invention is that, as tires 310/320 and kiln 60 experience differential thermal expansion, spring member 420 will flex or bend to accommodate the separate rates of thermal expansion of tires 310/320 and kiln 60.

Another advantage of the present invention is that the longitudinal axis of kiln 60 remains fixed because any relative motion of kiln 60 and tires 310/320 will be accommodated by the flexing of spring members 420. This is true whether rotary combustor 10 is ramping up to operating temperature or ramping down to idleness.

Still another advantage of the present invention is that the welded attachment of spring members 420 to kiln 60 is less susceptible to stress cracking because the thickened intermediate portion 430 of each spring member 420 is stronger by its cross-section and made from a high strength material resistant to stress cracking. Therefore, pre-heating or post-heating of intermediate portion 430 in order to lessen the occurrence of stress cracking is not required.

Yet another advantage of the present invention is that the operational life of spring members 420 is increased from between approximately seven to 10 years to between approximately 20 to 25 years.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof.

Therefore, what is provided is a rotary combustor and spring assembly therefor.

What is claimed is:

1. In a rotary combustor having a tire surrounding a kiln, a spring assembly comprising:

(a) a clevis member attached to a tire; and (b) a spring member having a first portion thereof pivotally connected to said clevis member and a second portion thereof attached to the kiln, where said spring member tapers from a larger cross section at the second portion thereof to a smaller cross section at the first portion thereof for providing flexibility to said spring member, and whereby said spring member allows for relative motion of the tire and the kiln as the first portion of said spring member pivots about said clevis member.

2. The spring assembly of claim 1, further comprising a flange outwardly extending from the second portion of said spring member, said flange being adapted to be welded to the kiln.

3. The spring assembly of claim 2, wherein said flange is formed of a metal having predetermined properties obviating the need to heat treat said flange.

4. The spring assembly of claim 3, wherein said flange is formed of carbon steel.

5. In a rotary combustor having a tire surrounding a rotatable kiln, a spring assembly for mitigating stress in the tire and the kiln, comprising:

(a) a first clevis member attached to the tire;

(b) a second clevis member attached to the tire;

(c) a first pivot pin extending through said first clevis member;

(d) a second pivot pin extending through said second clevis member; and (e) an elongate spring member interposed between the tire and the kiln, said spring member having an intermediate portion thereof attached to the kiln and having a first arm portion pivotally connected to said first pin and a second arm portion pivotally connected to said second pin, where each of the first and second arm portions tapers from a larger cross section at the intermediate portion to a smaller cross section thereof for providing flexibility to said spring member, and whereby said spring member flexes for mitigating stress in the tire and kiln as the first arm portion pivots about said first pin and as the second arm portion pivots about said second pin and as the intermediate portion is attached to the kiln.

6. The spring assembly of claim 5, further comprising a pair of oppositely disposed flanges outwardly extending from the intermediate portion of said spring member, each of said flanges being adapted to be welded to the kiln.

7. The spring assembly of claim 6, wherein each of said flanges is formed of a metal having predetermined properties obviating the need to heat treat the flanges.

8. The spring assembly of claim 7, wherein each of said flanges is formed of carbon steel.

9. A rotary combustor for burning waste material, comprising:

(a) a rotatable kiln for burning the waste material therein, said kiln having a circular perimeter;

(b) a tire surrounding said kiln for rotating said kiln, said tire having an inner circumference;

(c) a first clevis member attached to the inner circumference of said tire;

(d) a second clevis member spaced-apart from said first clevis member and attached to the inner circumference of said tire;

(e) a first pivot pin extending through said first clevis member;

(f) a second pivot pin extending through said second clevis member; and (g) an elongate spring member interposed between said tire and said kiln, said spring member having an intermediate portion thereof attached to the perimeter of said kiln and having a first arm portion having a first bore therethrough for pivotally receiving said first pin and having a second arm portion having a second bore therethrough for pivotally receiving said second pin, where each of the first and second arm portions tapers from a larger cross section at the intermediate portion to a smaller cross section thereof for providing flexibility to said spring members, and whereby said spring member flexes for mitigating stress in said tire and said kiln as the first arm portion pivots about said first pin and as the second arm portion pivots about said second pin and as the intermediate portion is attached to the perimeter of said kiln.

10. The rotary combustor of claim 9, further comprising a pair of oppositely disposed flanges outwardly extending from the intermediate portion of said spring member, each of said flanges being adapted to be welded to said kiln.

11. The rotary combustor of claim 10, wherein each of said flanges is formed of a metal having predetermined properties obviating the need to heat treat said flanges.

12. The rotary combustor of claim 11, wherein each of said flanges is formed of carbon steel.

* * * * *